United States Patent Office 3,449,315
Patented June 10, 1969

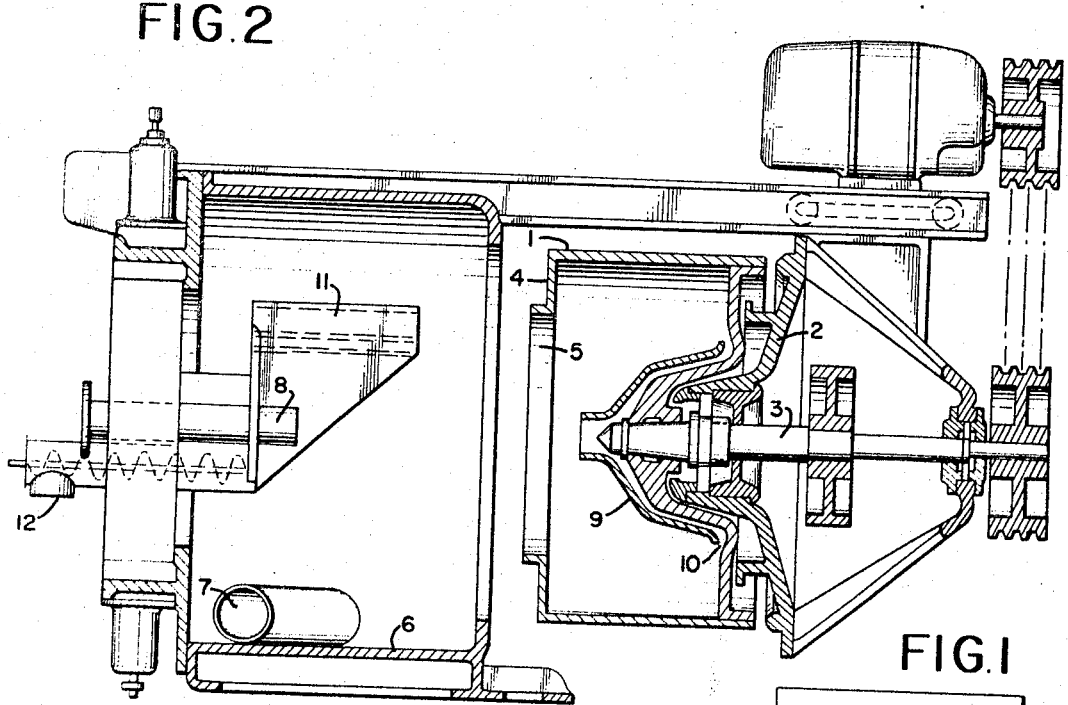
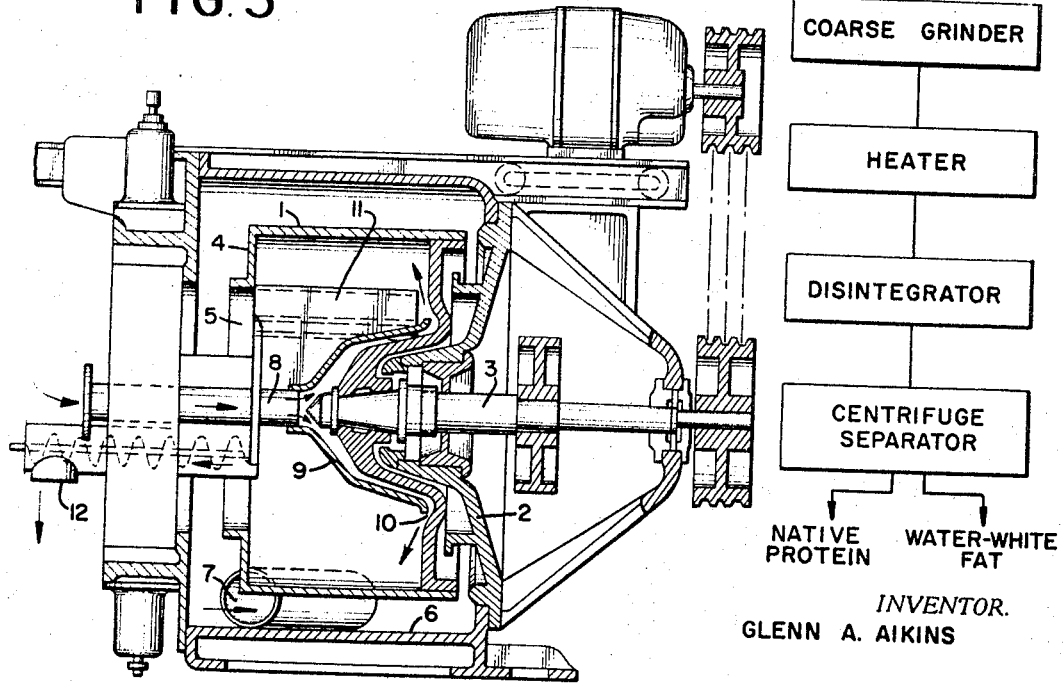

3,449,315
LOW TEMPERATURE RENDERING OF ANIMAL FATTY TISSUE TO RECOVER PROTEIN
Glenn A. Aikins, Chicago, Ill., assignor to Armour and Company, Chicago, Ill., a corporation of Delaware
Continuation-in-part of application Ser. No. 249,485, Jan. 4, 1963. This application Oct. 12, 1966, Ser. No. 601,249
Int. Cl. A23b 5/02; A23j 1/00
U.S. Cl. 260—112                 6 Claims This case is a continuation-in-part of my copending U.S. patent application Ser. No. 249,485 filed Jan. 4, 1963, now abandoned which was a continuation-in-part of my copending U.S. patent application Ser. No. 14,656, filed Mar. 14, 1960, now abandoned.

This invention relates to the low temperature rendering of animal fatty tissue in order to recover a substantially protein-free fat fraction and also to recover a native protein fraction.

In the treatment of fatty animal tissue containing protein to recover animal proteins, the practice has been employed of disintegrating the tissue, heating the disintegrated tissue to a higher temperature, and then centrifuging the disintegrated material, usually at temperatures above 125° F. and sometimes at temperatures slightly below 120° F. In such operations, one practice has been to separate the mixture in a continuous manner by directing the protein in one direction and the liquid fat in the opposite direction for continuous recovery of these fractions. Under such procedures, it has been asserted that recovery of protein might be as high as 85%.

The recovery of 85% of the protein is not a satisfactory recovery because the unrecovered proteins exist in the lard and the protein is therefore a contamination which must be removed by further separative treatment, which results in destruction and loss of native protein. A further very substantial disadvantage is that the water-soluble proteins remain with the liquid fat fraction.

An object of the present invention is to provide a process for the recovery of protein from animal fatty tissue containing protein under conditions which bring about recovery of protein to a much greater extent than has heretofore been recovered, while also recovering water-soluble protein with the protein fraction. A further object is to provide a process for the separation of animal protein from animal fat by utilizing heating steps in which the final heating is accomplished by a disintegration operation in which the heat is supplied uniformly throughout the mass. Still another object is to provide a process in which an effective separation between the protein and fat of animal fatty tissue is accomplished at low temperatures in a process in which the protein and fat pass through an elongated centrifugation zone, with the liquid fat being drawn off separately and continuously from the end of the zone opposite the end of introduction.

Yet a further object is to provide a process in which fatty animal tissue containing protein is comminuted, heated, and disintegrated to form a protein and liquid fat fluid mixture which is discharged with turbulence into a centrifugation zone with separation of the protein from the fat fraction being accomplished progressively as the mixture is passed through the zone in a single direction and under quiescent conditions. Other specific objects and advantages will appear as the specification proceeds.

In one embodiment of the invention, a rough fat trimming or trimmed fat or other form of animal fatty tissue is ground in a coarse grinder and the material heated as, for example, in a steam-jacketed, agitator-equipped heater, to bring the temperature preferably between 80° and 110° F. The heated material is then disintegrated as, for example in a Rietz Disintegrator, to form a creamy mixture of protein and liquid fat. In the last operation, the friction in the disintegrating operation increases the temperature of the mass uniformly throughout, but the temperature is maintained below 120° F. to prevent coagulation or denaturing of the protein.

I prefer to separate the protein and fat by centrifuging in apparatus in which the mixture is discharged into a centrifuge providing a longitudinal or elongated centrifugation path or zone, the mixture being delivered with turbulence below the liquid surface into one end of the zone and the mass then being passed in a single direction through the zone while under centrifugal pressure so that the protein, including the water-soluble protein, collects on the outer side of the centrifuge and the liquid fat, freed of protein, overflows at the end of the zone opposite the inlet. After the cake of protein has been built up within the centrifuge, the liquid fat may be decanted and the protein then separately recovered.

In the accompanying drawing, one embodiment of the invention is illustrated, in which drawing FIGURE 1 is a diagrammatic showing of the sequence of steps which may be employed in the practice of the invention; FIG. 2, a vertical sectional view of separator apparatus which may be used, the apparatus being in open and non-operating position; and FIG. 3, a view similar to FIG. 2 but showing the separator apparatus closed and in operating position.

As above stated, various forms of separating apparatus may be employed for the protein and fat separating operation. The apparatus shown in FIGS. 2 and 3 is old and well known, and it consists principally of a horizontal bowl 1 having a back plate 2 closing its rear side and rotatably supported on a bearing. The plate is driven by power shaft 3. The bowl 1 has an open front side provided with an inwardly-turned rim 4 equipped with an over-spill lip 5. A casing 6 receives liquid spilling over lip 5 and discharges the liquid through outlet 7. The fluid mixture to be separated is fed, as seen best in FIG. 3, through inlet pipe 8 and into an inlet jacket 9 carried by bowl 1, the jacket being spaced from the back plate 2 and providing therewith an inlet chamber discharging peripherally at the outlet 10 into the pool or body of material held within the bowl by the rim 4. It is within this pool or recess that the protein cake or solids build up within the bowl as the liquid flows over the lip 5. Means (not shown) are provided for decanting the last of the liquid after the cake is built up. A plow 11 is supported by lift mechanism for the removal of the cake or solids collected within the peripheral recess of the bowl, and the solids are withdrawn through a screw conveyor-equipped outlet 12. Since the apparatus is well known in the art, a further detailed description herein is believed unnecessary.

In employing the foregoing apparatus for the separating operation, it is found that the fluid mixture entering the jacket 9 is impelled with turbulence into the pool of liquid that initially fills the centrifugation zone formed by the peripheral bowl recess. However, from this point of introduction into the pool there is a very substantial distance of flow through which the mixture passes on its way toward the rim 4 and over-spill lip 5, and this elongated flow is found to provide a quiescent condition under which effective separation takes place. This flow distance is preferably about three times the depth of the centrifugal zone formed by the length of the rim but can be from about two to five times the depth of the zone. The turbulent feed of the mixture into the pool, followed by a relatively quiescent flow of the material through the longitudinal or elongated centrifugation path, contributes to the effective separation in which the protein solids and water-soluble protein build up in a cake against the walls of the bowl and the liquid fat overflows over lip 5.

In plant operations dealing with animal fatty tissue containing lean meat, it is common to have personnel trimming tissue bodies as, for example, loin fat or a rough trimming off the shoulder or back or jowl, to save a portion of the lean meat, the remainder of the fat being sent to a rendering station. With the present process, it is possible to omit all of the trimming operations and, instead, to deliver the rough trimming and all of the fatty tissue directly to the protein recovery station, so that in a single operation the native protein can be recovered, and separately the fat uncontaminated with protein or protein solubles can be recovered. Further, after the separating operation, the liquid fat may be filtered and used without deodorizing treatment or other treatment heretofore necessary in plant processes.

Specific examples of the process herein may be set out as follows:

EXAMPLE I 7400 lbs. of rough pork trimmings containing fat and lean portions were delivered at 55° F. to a coarse grinder which reduced the material to sections of from 3/8" to 1/2". This material was discharged into a steam-jacketed, agitator-equipped heater and the temperature raised to 90–92° F. The heated material was then pumped to a Rietz Disintegrator, which formed a creamy fluid mass in which the protein fibers floated in liquid fat. The disintegrator brought the temperature of the material up to 100–106° F. At the latter temperature, the material was pumped into a separator of the type shown in FIG. 3 of the drawing. In the latter separation, carried on at approximately 106° F., the liquid fat flowed over the lip 5 and was separately recovered. After the protein body was built up to substantially fill the recess formed by the lip 4, all of the liquid fat was decanted and the protein removed. The protein had the bright pink color of native protein (meat). A substantially quantitative recovery of the protein was effected and the protein was used in sausage and other meat products for human consumption, the protein being native and useful in all-meat products. The lard was recovered free of protein and protein solubles, and no deodorizing treatment was found necessary. It was water white, odorless and tasteless. No polymers were formed, and the material was free of incipient rancidity. The product was recovered as commercially pure lard by merely drying and filtering.

EXAMPLE II 4700 lbs. of commercial pork fat trimmings were comminuted as described in Example I and then heated to approximately 92° F. The material was then disintegrated as described in Example I to raise the temperature to 106–108° F. The results obtained were substantially the same as those described in Example I.

EXAMPLE III 6,000 lbs. of trimmed pork fat having a moisture content of 6.9%, a fat content of 91%, and a protein content of 2.1%, were processed as described in Example I, except that the initial heating was to a temperature of 96°–98° F. On disintegration, the temperature went up to 108°–109° F. The results were comparable to those described in Example I. The protein had the bright pink color of natural lean meat and it contained the water-soluble proteins. Instead of sending the protein from the fatty tissue to tankage, as in the conventional rendering method, the protein remained unchanged as native protein and was used for edible purposes.

EXAMPLE IV 6,900 lbs. of rough pork trimmings containing fat and lean portions were delivered at 55° F. to a coarse grinder and the ground material discharged into a steam-jacketed, agitator-equipped heater and the temperature raised to 84°–86° F. The heated material was then pumped to a Rietz Disintegrator in which the material was disintegrated, bringing the temperature of the material up to 100°–103° F. The material was then pumped into a separator of the type shown in FIG. 3, and separation effected at the temperature of approximately 103° F., the separating operations being as described in Example I. The separation carried on at the low temperature of 103° F. was excellent, the lard having a water-white appearance and, after drying and filtering, being used as commercially pure lard.

EXAMPLE V 7,000 lbs. of rough pork trimmings similar to those treated in Example IV were heated to approximately 83°–84° F. and then disintegrated to bring the temperature to 99°–100° F., at which temperature the material was centrifuged in the manner described in Example I. The results were comparable to those obtained in Example IV.

EXAMPLE VI 3,500 lbs. of pork fatty tissue containing fat and lean portions were heated and disintegrated, bringing the temperature up to approximately 115° F. The heated material was then pumped from the disintegrator (Rietz Disintegrator) to a separator of the type shown in FIG. 3 of the drawing, and the separation was carried out and described in Example I at a temperature of 115° F. 95% of the protein was recovered, and such protein was edible protein.

EXAMPLE VII 6,500 lb. of pork rough fat trimmings were heated to approximately 80° F. and then disintegrated to bring the temperature approximately to the melting-point of the fat fraction, which in this case was 95° F. The material was then centrifuged as described in Example I at the temperature of about 95° F. A quantitative recovery of protein was obtained, the lard being water-white and free of protein.

In the foregoing operations, it was found that by adding the final heat through the friction of the disintegration step, a sharp separation took place giving a substantially increased yield of protein. In such operations, good results were obtained when the temperatures were raised in the distintegration step to 120° F. While temperatures from 90° F. to above 115° F. may be used, I prefer to employ temperatures between 25° and 115° F. for the separating operations. Excellent results have been obtained when the separation step is carried on at temperatures between 95° and 110° F. I prefer that the separation temperature be between 120° F. and the melting-point of the fat fraction.

Further, the concurrent flow of the protein and liquid fat fractions through an elongated centrifugation zone and under centrifugal pressure increased the effective separation and the high recovery of protein. Such a separating procedure has the advantage that the feed is introduced at one end of the centrifugation zone in a turbulent action, and this is followed by travel in a single direction of both protein and liquid fat under relatively quiescent conditions, with the final overflow of the separated liquid fat at the opposite end of the centrifugation zone.

While, in the foregoing specification, I have set forth a specific process in considerable detail for the purpose of illustrating an embodiment of the invention, it will be understood that such details of procedure and method may be varied widely by those skilled in the art without departing from the spirit of my invention.

I claim:

1. In a low temperature rendering process for recovering a fat fraction and a protein fraction from animal fatty tissue from mammals, the steps of grinding said tissue, heating and mechanically disintegrating said tissue to bring the temperature thereof between 90 and 120° F. and to form a fluid mixture of protein and liquid fat, and mechanically separating said protein from the liquid fat at a temperature below 120° F. by introducing said fluid mixture at one end of a centrifugal bowl while being subjected to centrifugal pressure under relatively quiescent conditions, said quiescent conditions being provided by a recess in said bowl defined by an inwardly turned rim spaced forwardly of a closed rear side of said bowl.

2. The process of claim 1 in which the temperature is maintained below 115° F. and the separation is carried on at a temperature between 95 and 115° F.

3. In a low temperature rendering process for recovering a fat fraction and a protein fraction from animal fatty tissue from mammals, the steps of grinding said tissue, heating and mechanically disintegrating said tissue at a temperature below 115° F. to form a fluid mixture of protein and liquid fat, maintaining in the bowl of a centrifuge an elongated quiescent zone of centrifugation at a temperature below 115° F., said fluid mixture being introduced by a turbulent discharge into the closed rear side of said bowl and traveling toward an inwardly turned rim of said bowl while being subjected to centrifugal pressure, and separating the liquid fat from the protein by withdrawing the fat from the bowl adjacent to said inwardly turned rim, said elongated quiescent zone of centrifugation being provided by a recess defined by said inwardly turned rim spaced forwardly of said closed rear side of said bowl.

4. In a low temperature process for rendering animal fatty tissue from mammals, the steps of grinding said tissue, mechanically disintegrating the tissue at a temperature of below 120° F. to form a fluid mixture of protein and liquid fat and passing said mixture through an elongated zone of centrifugation in the bowl of a centrifuge in which the protein and liquid fat travel in a quiescent path under centrifugal force in order to separate said protein from said liquid fat, and continuously withdrawing liquid fat at the opposite end of said centrifugation zone, said elongated zone and quiescent path being provided by a recess defined by an inwardly turned rim spaced forwardly of a closed rear side of said bowl.

5. The process of claim 4 in which the protein is recovered separately after the decanting of the liquid fat.

6. In a low temperature rendering process for recovering a fat fraction and a protein fraction from animal fatty tissue from mammals, the steps of grinding said tissue, heating and mechanically disintegrating the fatty tissue at a temperature of below 120° F. to form a fluid mixture of protein and liquid fat and discharging said fluid mixture to centrifuging in the bowl of a centrifuge, introducing said mixture with turbulence in the closed rear side of said bowl and at an angle to the direction of flow therein, and passing the liquid fat and protein mixture through said bowl and toward an inwardly turned rim of said bowl, maintaining centrifugal pressure to separate the protein and fat in parallel strata, and continuously moving fat from said liquid fat strata.

References Cited

UNITED STATES PATENTS

| | | | |
|---|---|---|---|
| 2,679,974 | 6/1954 | Gooch | 233—7 |
| 2,703,676 | 3/1955 | Gooch | 233—7 |
| 2,911,421 | 11/1959 | Greenfield | 260—412.6 |
| 3,020,160 | 2/1962 | Downing | 99—14 |
| 3,078,287 | 2/1963 | Downing | 260—412.6 |

WILLIAM H. SHORT, *Primary Examiner.*

HOWARD SCHAIN, *Assistant Examiner.*

U.S. Cl. X.R.

99—18.14; 260—412.6